(12) United States Patent
Toyama et al.

(10) Patent No.: US 11,840,869 B2
(45) Date of Patent: Dec. 12, 2023

(54) OUTSIDE HANDLE DEVICE FOR VEHICLE

(71) Applicant: ALPHA CORPORATION, Kanagawa (JP)

(72) Inventors: Takao Toyama, Yokohama (JP); Kazuya Tanaka, Yokohama (JP)

(73) Assignee: ALPHA CORPORATION, Kanagawa (JP)

(*) Notice: Subject to any disclaimer, the term of this patent is extended or adjusted under 35 U.S.C. 154(b) by 208 days.

(21) Appl. No.: 17/026,432

(22) Filed: Sep. 21, 2020

(65) Prior Publication Data

US 2021/0002928 A1 Jan. 7, 2021

Related U.S. Application Data

(63) Continuation of application No. PCT/JP2019/022231, filed on Jun. 4, 2019.

(30) Foreign Application Priority Data

Jun. 8, 2018 (JP) ................................ 2018-110062

(51) Int. Cl.
*E05B 81/56* (2014.01)
*E05B 81/16* (2014.01)
(Continued)

(52) U.S. Cl.
CPC .............. *E05B 81/56* (2013.01); *E05B 81/04* (2013.01); *E05B 81/16* (2013.01); *E05B 85/107* (2013.01);
(Continued)

(58) Field of Classification Search
CPC .......... E05B 81/56; E05B 81/04; E05B 81/16; E05B 85/107; E05B 85/103; E05B 81/76
See application file for complete search history.

(56) References Cited

U.S. PATENT DOCUMENTS 8,701,353 B2 * 4/2014 Patel ..................... E05B 85/103
292/201
10,075,163 B2 * 9/2018 Nishiyama ......... G01R 27/2605
(Continued)

FOREIGN PATENT DOCUMENTS

DE 10340792 A1 4/2005
EP 2228906 A1 * 9/2010 ............. E05B 81/76
(Continued)

OTHER PUBLICATIONS

The extended European search report issued by the European Patent Office dated Feb. 4, 2022, which corresponds to European U.S. Appl. No. 19814459.4-1005 and is related to U.S. Appl. No. 17/026,432.
(Continued)

*Primary Examiner* — Kristina R Fulton
*Assistant Examiner* — Emily G. Brown
(74) *Attorney, Agent, or Firm* — Studebaker & Brackett PC

(57) ABSTRACT

An outside handle device for vehicle includes an operation handle configured to serve as a handhold at a time of a door opening operation, and an electric actuator configured to drive the operation handle between an accommodated position and a use position. The outside handle device for vehicle is configured to allow a locking accommodating operation having a locking operation of a door latch device fixed to a door and a non-locking accommodating operation not having a locking operation when the operation handle is moved to the accommodated position.

7 Claims, 8 Drawing Sheets

(51) Int. Cl.
  *E05B 85/10* (2014.01)
  *E05B 81/76* (2014.01)
  *E05B 81/04* (2014.01)

(52) U.S. Cl.
  CPC ......... *E05B 81/76* (2013.01); *E05Y 2201/638* (2013.01); *E05Y 2201/686* (2013.01); *E05Y 2201/702* (2013.01); *E05Y 2201/704* (2013.01); *E05Y 2400/854* (2013.01); *E05Y 2400/86* (2013.01)

(56) References Cited

U.S. PATENT DOCUMENTS

| | | | | |
|---|---|---|---|---|
| 10,280,658 | B2* | 5/2019 | Halliwell | E05B 85/107 |
| D874,243 | S | 2/2020 | Smart | |
| 2009/0039671 | A1* | 2/2009 | Thomas | E05B 85/107 292/336.3 |
| 2011/0148575 | A1* | 6/2011 | Sobecki | E05B 85/107 292/336.3 |
| 2012/0247161 | A1* | 10/2012 | Muller | E05B 85/107 70/91 |
| 2013/0079984 | A1* | 3/2013 | Aerts | G07C 9/00944 292/336.3 |
| 2014/0000167 | A1 | 1/2014 | Patel et al. | |
| 2014/0265372 | A1* | 9/2014 | Smart | E05B 5/003 292/336.3 |
| 2014/0365080 | A1* | 12/2014 | Hirota | E05F 15/632 701/49 |
| 2015/0233153 | A1 | 8/2015 | Smart et al. | |
| 2015/0233154 | A1* | 8/2015 | Smart | E05B 85/107 70/237 |
| 2015/0330115 | A1* | 11/2015 | Kleve | E05B 81/76 292/216 |
| 2016/0222702 | A1 | 8/2016 | Koizumi et al. | |
| 2016/0281397 | A1* | 9/2016 | Park | E05B 85/103 |
| 2016/0369537 | A1 | 12/2016 | Rocci et al. | |
| 2017/0130493 | A1 | 5/2017 | Guerin et al. | |
| 2018/0171686 | A1* | 6/2018 | Couto Maquieira | E05B 85/107 |
| 2018/0245380 | A1 | 8/2018 | Guerin et al. | |
| 2019/0234104 | A1 | 8/2019 | Smart | |
| 2019/0234122 | A1* | 8/2019 | Löw | E05B 85/103 |
| 2020/0340287 | A1* | 10/2020 | Nishizuka | B60J 5/06 |

FOREIGN PATENT DOCUMENTS

| | | | | |
|---|---|---|---|---|
| EP | 3088641 | A1 * | 11/2016 | ............ E05B 81/76 |
| EP | 3263812 | A1 | 1/2018 | |
| JP | 2015-206259 | A | 11/2015 | |
| JP | 2015-533964 | A | 11/2015 | |
| JP | 2016-142045 | A | 8/2016 | |
| JP | 2017-008712 | A | 1/2017 | |
| WO | 2018/010939 | A1 | 1/2018 | |

OTHER PUBLICATIONS

International Search Report issued in PCT/JP2019/022231; dated Aug. 13, 2019.
International Preliminary Report on Patentability (Chapter I) and Written Opinion of the International Searching Authority issued in PCT/JP2019/022231; dated Dec. 8, 2020.

* cited by examiner

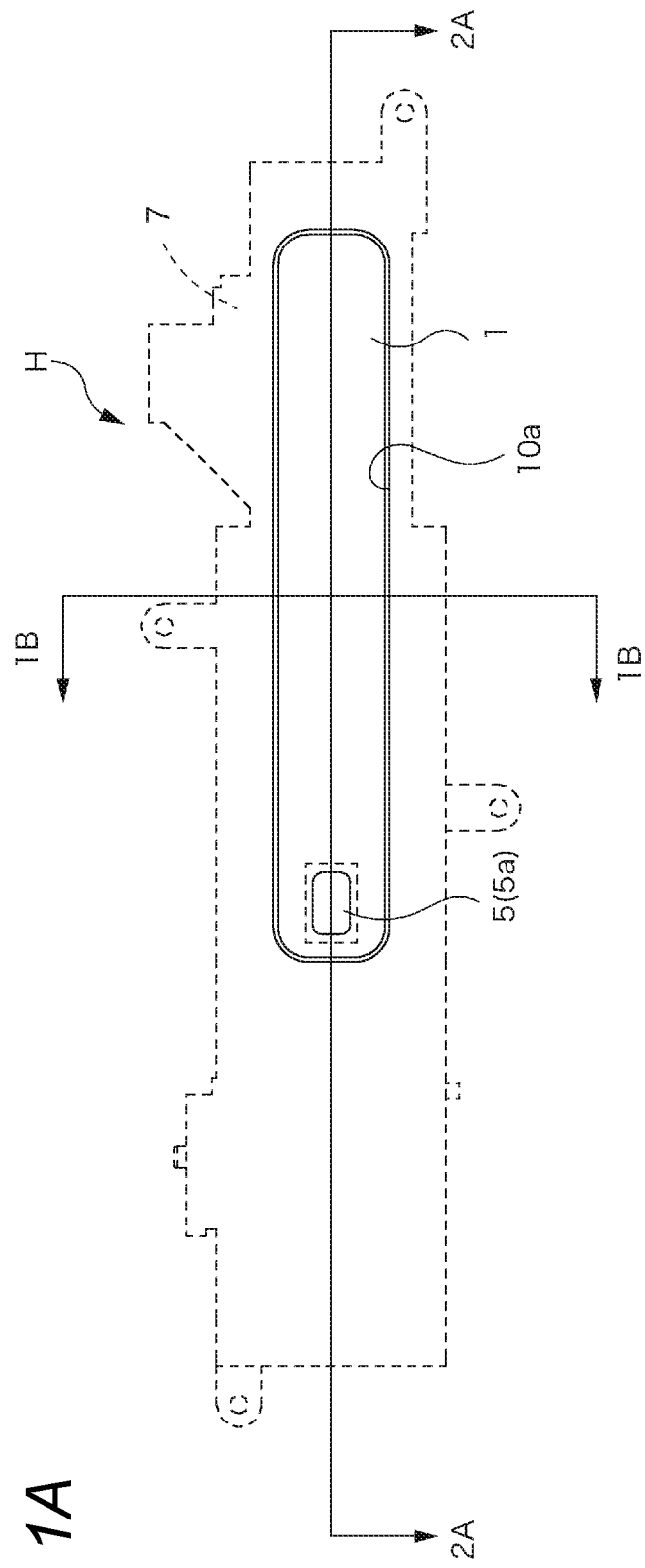
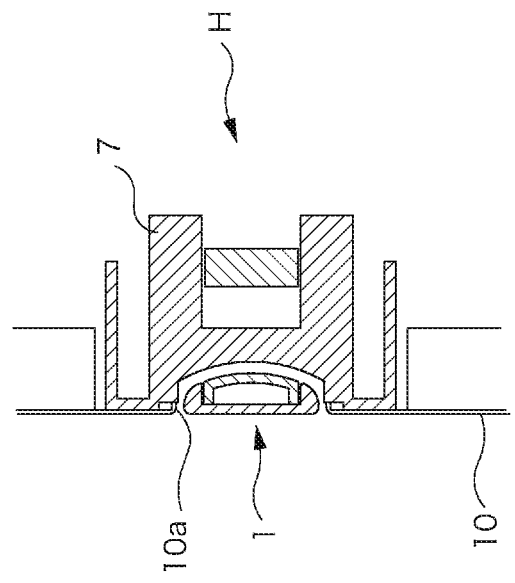

OUTSIDE HANDLE DEVICE FOR VEHICLE

CROSS REFERENCE TO RELATED APPLICATIONS

This application claims priority from PCT application No. PCT/JP2019/022231, which was filed on Jun. 4, 2019 based on Japanese Patent Application No. 2018-110062 filed on Jun. 8, 2018, the entire contents of which are incorporated herein by reference.

BACKGROUND OF THE INVENTION

Field of the Invention

The present invention relates to an outside handle device for vehicle.

Description of Related Art

Patent Literature 1 (JP-T-2015-533964) discloses an outside handle device for vehicle that uses an electric actuator to drive an operation handle between an accommodated position and a use position. The handle device of Patent Literature 1 includes a movable handle (operation handle) between the accommodated position and an arrangement position, and a drive mechanism.

When the operation handle is in the accommodated position, if a sensor attached to the operation handle detects operation of a user, a lock mechanism transits to an unlocked state, and the operation handle moves to the arrangement position.

When the sensor detects operation or the operation handle is manually move to the accommodated position in this state, the lock mechanism transits to a locked state.
[Patent Literature 1] JP-T-2015-533964

According to a related art, since a transition to an accommodated position of an operation handle is paired with locking operation with respect to a lock mechanism, the operation handle cannot be accommodated in the unlocked state, which results in poor usability.

SUMMARY

One or more embodiments provide an outside handle device for vehicle, which is possible to allow an operation handle to transit to an accommodated position in an unlocked state, thereby improving usability.

In accordance with one or more embodiments of this invention, an outside handle device for vehicle includes an operation handle 1 configured to serve as a handhold at a time of a door opening operation, and an electric actuator 2 configured to drive the operation handle 1 between an accommodated position and a use position. The outside handle device for vehicle is configured to allow a locking accommodating operation having a locking operation of a door latch device 3 fixed to a door and a non-locking accommodating operation not having a locking operation when the operation handle 1 is moved to the accommodated position.

BRIEF DESCRIPTION OF THE DRAWINGS

FIG. 1A is a front view showing a state in which a handle device is fixed to a door of a vehicle. FIG. 1B is a cross-sectional view taken along a line 1B-1B in FIG. 1A.

DETAILED DESCRIPTION

As shown in FIG. 1A, a door handle device (H) is formed by coupling an operation handle 1 to a handle base 7 via first and second link members 8 and 9, and is fixed to a door of the vehicle at the handle base 7.

Figure 4A:
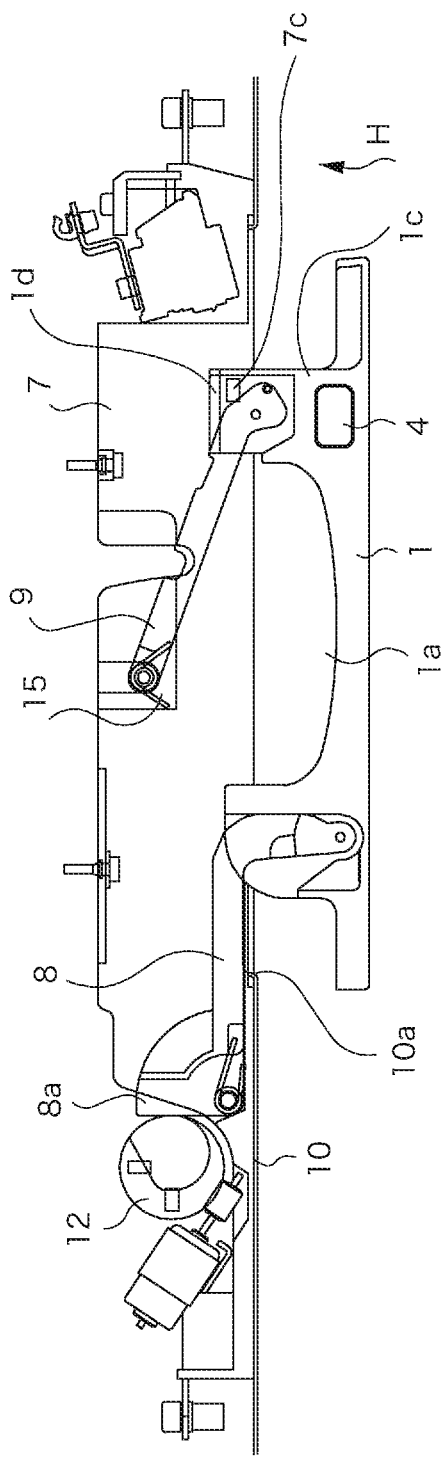
FIG. 4A is a diagram illustrating a use state of link members.
Figure 4B:
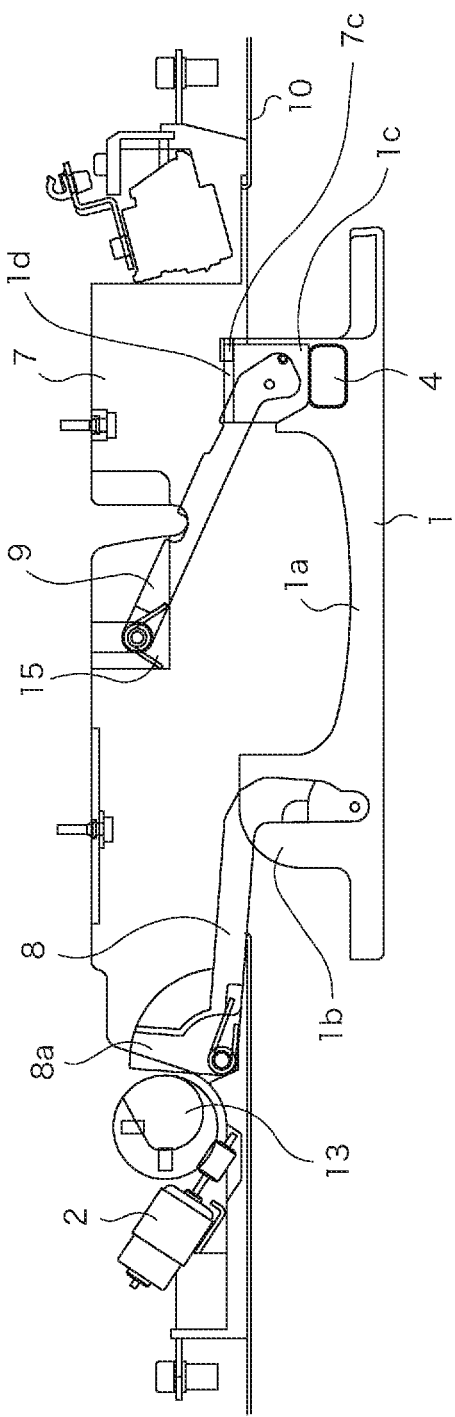
FIG. 4B is a view diagram illustrating a latch release state of the link members.

The present embodiment is a flush surface type handle device in which in a state in which the handle base 7 is fixed to the door, the operation handle 1 can move between an accommodated position shown in FIGS. 1A to 2B and an unlatched position shown in FIG. 4B, and a surface of the operation handle 1 in the accommodated position is located at the same surface as a door surface 10 (door outer panel) and is housed in a handle housing opening 10a formed in the door outer panel 10.

The operation handle 1 includes front and rear link coupling portions 1b and 1c so as to sandwich a handhold recess 1a disposed in an intermediate portion thereof, and one end of the first link member 8 and one end of the second link member 9 are respectively pin-connected to the front link coupling portion 1b and the rear link coupling portion 1c.

In this specification, a left side of FIG. 1A is "front", a right side is "rear", a left side in FIG. 1B is an "external" direction, and an opposite direction is an "internal" direction.

Figure 2A:
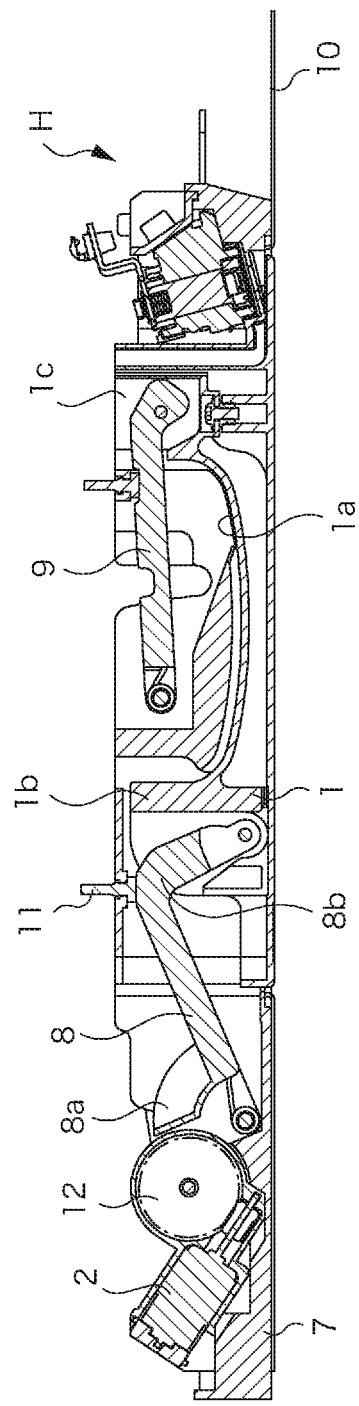
FIG. 2A is a cross-sectional view taken along line 2A-2A in FIG. 1A.
Figure 2B:
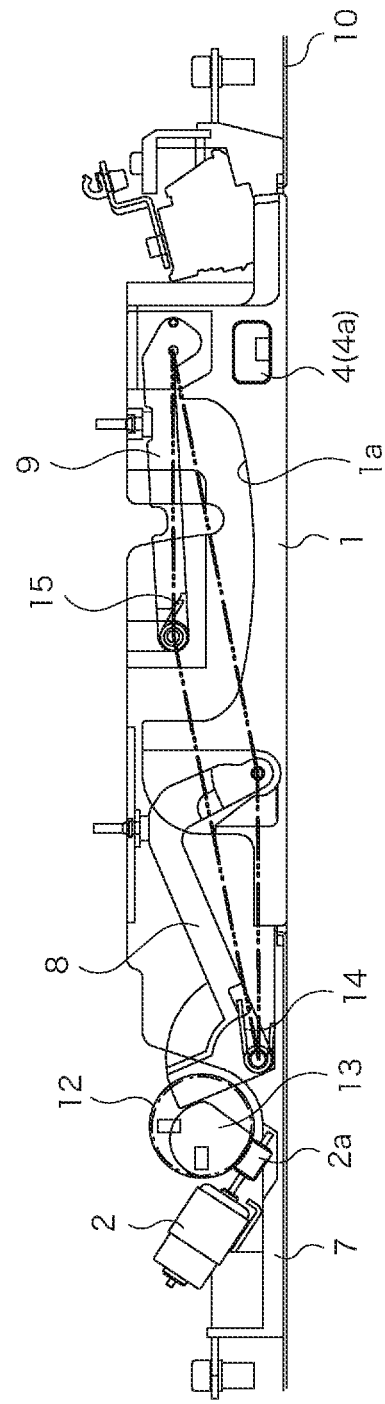
FIG. 2B is a link configuration diagram.

Further, a first switch operation unit 5a for operating a first switch serving as a locking accommodation instructing unit 5 is disposed at an external front end portion of the operation handle 1, and a second switch operation unit 4a for operating a second switch serving as a non-locking accommodation instructing unit 4 is disposed on a side wall portion of the rear link coupling portion 1c, more precisely, on a side wall portion that faces an upper side in a state fixed to the door, as shown in FIG. 2B, and at a position at which the second switch operation unit 4a is buried in the door when in the accommodated position.

In this embodiment, capacitance sensors are used as the first and second switches 5 and 4, and detection electrodes of the capacitance sensors are used as the first switch operation unit 5a and the second switch operation unit 4a.

Figure 3A:
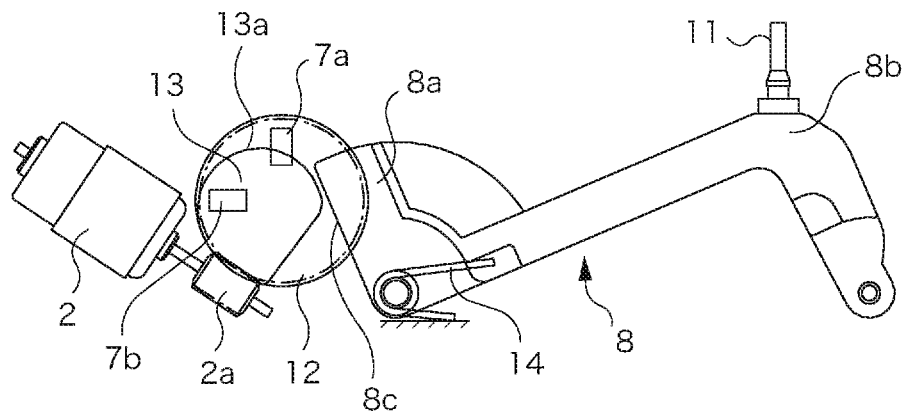
FIG. 3A is a diagram illustrating an initial rotation position of a first link member.
Figure 3B:
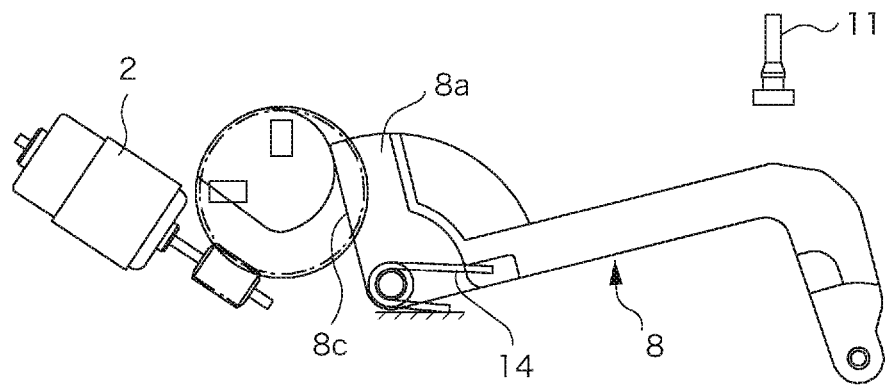
FIG. 3B is a diagram illustrating an operational rotation position of the first link member.
Figure 3C:
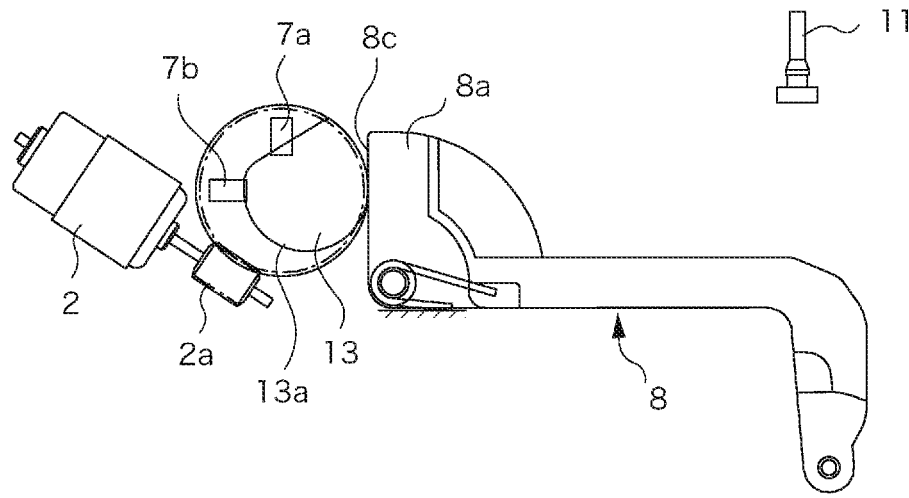
FIG. 3C is a diagram illustrating a use position of the first link member.

As shown in FIGS. 3A to 3C, in the first link member 8, a front end portion is provided with a fan-shaped cam follower portion 8a, an intermediate portion is bent toward an internal side into a V-shape, and a bent portion 8b is brought into pressure contact with a rubber first stopper member 11 formed on the handle base 7 and held in an initial rotation position shown in FIG. 3A.

Further, a motor as an electric actuator 2 and a worm wheel 12 meshing with a worm gear 2a that is fixed to a rotation shaft of the motor 2 are arranged on the handle base 7. A cam member 13 having a cam surface 13a is coupled to the worm wheel 12 that is driven to rotate about the rotation shaft, and rotates coaxially with the worm wheel 12.

The cam member 13 is arranged in a moving region of the cam follower portion 8a of the first link member 8, and rotates clockwise in FIG. 3A when the motor 2 is driven from a state corresponding to the accommodated position of the operation handle 1 shown in FIG. 3A. A rotation angle of the cam member 13 is detected by the use position detection sensor 7a and the accommodated position detection sensor 7b fixed to the handle base 7, so as to identify an accommodated position correspondence state shown in FIG. 3A and a use position correspondence state shown in FIG. 3C.

When the cam member 13 is driven to rotate from the state shown in FIG. 3A and restraint of the first link member 8 by the first stopper member 11 is released, a planar follower surface 8c formed at a front end of the cam follower portion 8a of the first link member 8 comes into pressure contact with the cam surface 13a of the cam member 13 due to a torsion spring 14 that urges the first link member 8 counterclockwise, and thereafter follows a change of the cam surface 13a (see FIG. 3B).

When the cam member 13 is further driven to rotate from this state, the follower surface 8c is pushed by the cam surface 13a and held in the operational rotation position shown in FIG. 3C, and the first link member 8 can be returned to the initial rotation position by driving the cam member 13 counterclockwise from this state.

As shown in FIG. 2A to 3C, since the first and second link members 8 and 9, the operation handle 1, and the handle base 7 constitute a four-bar parallel crank mechanism (see broken lines in FIG. 2B), when the first link member 8 is rotated from the initial rotation position to the operational rotation position, the operation handle 1 is moved from the accommodated position to the use position shown in FIG. 4A while maintaining a parallel posture.

The handhold recess to buried in the door in the accommodated position is exposed to an outside in correspondence with the movement to the use position, a sufficient handhold space is ensured between the handhold recess 1a and the door surface, and then the door latch device 3 can be unlatched by putting a hand into a handhold space and moving the operation handle 1 to the unlatched position shown in FIG. 4B.

In order to prevent the operation handle 1 from further moving in a pulling-out direction from the unlatched position, the operation handle 1 and the handle base 7 are provided with appropriate stoppers (not shown) that are locked at the unlatched position to regulate a pull-out side stroke.

In this embodiment, the unlatch of the door latch device 3 is performed by an electric actuator (not shown).

That is, as shown in FIG. 4B, when the operation handle 1 is moved to the unlatched position, a switch pushing portion 1d protruding from the rear link coupling portion 1c of the operation handle 1 pushes a microswitch 7c attached to the handle base 7, thereby driving the electric actuator for unlatching to unlatch the door latch 3a of the door latch device 3.

In this state, the door opening operation can be performed by pulling the operation handle 1 toward the outside of the vehicle. Thereafter, when a pulling-out operation force applied to the operation handle 1 is released, the operation handle 1 moves toward the accommodated position by restoring forces of the torsion spring 14 and a torsion spring 15 wound around a rotation center of the handle base 7 and the second link member 9, and stops at the use position where the follower surface 8c of the first link member 8 comes into contact with the cam surface 13a.

When the operation handle 1 is moved to the use position as shown in FIGS. 4A and 4B, the second switch operation unit 4a buried in the door at the accommodated position is exposed to the outside of the door, and if the second switch operation unit 4a is touched in this state, the electric actuator 2 is driven to return the operation handle 1 to the accommodated position.

Figure 5:
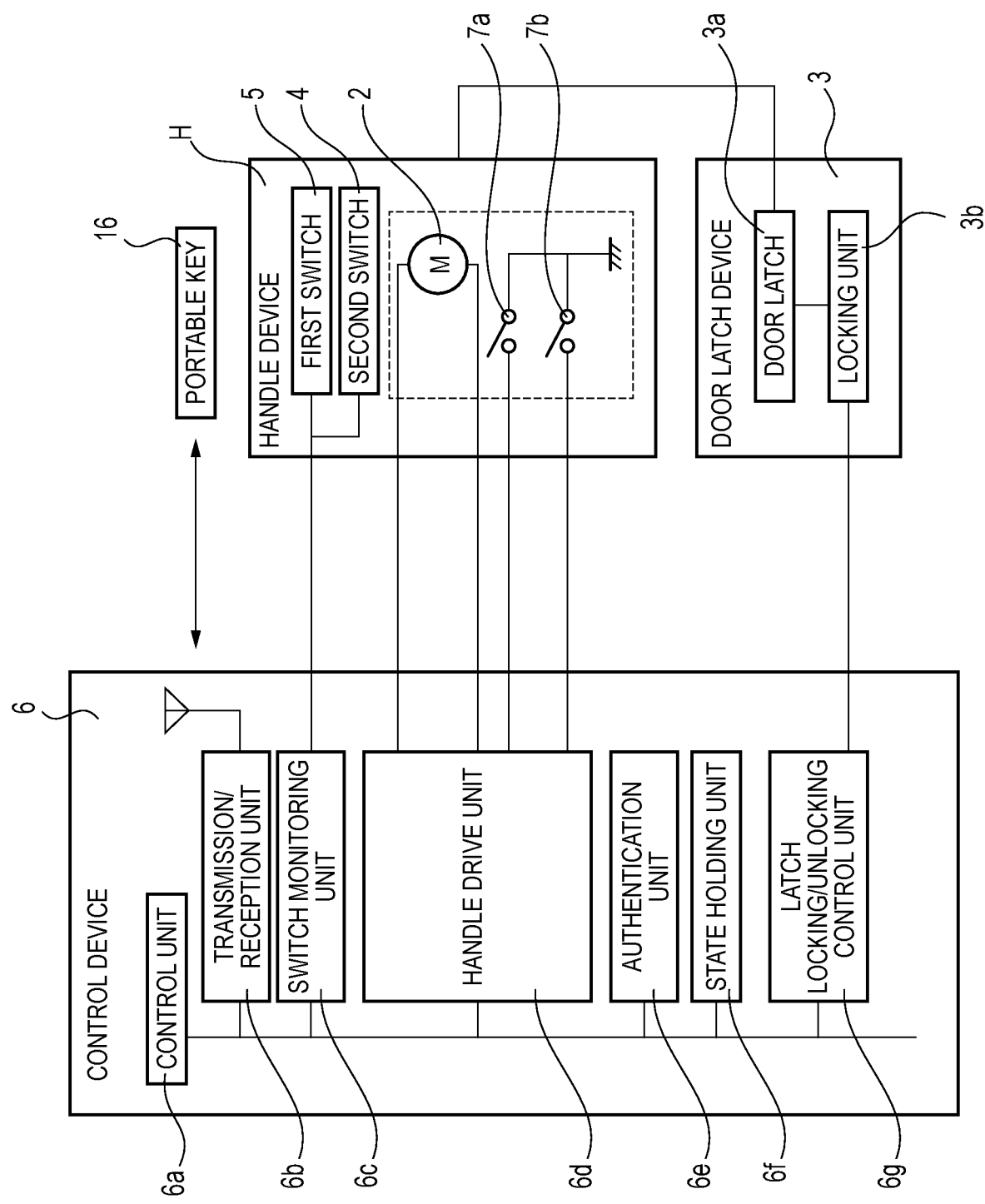
FIG. 5 is a block diagram of a door operating device.

A block diagram of a vehicle door operating device using the operation handle 1 configured as described above is shown in FIG. 5.

The door operating device includes a handle device (H), a door latch device 3, and a control device 6, and as described above, the handle device (H) is provided with the first and second switches 5 and 4, the motor 2, and the use position detection sensor 7a and the accommodated position detection sensor 7b.

The control device 6 includes a control unit 6a, a transmission/reception unit 6b that operates under control of the control unit 6a, a switch monitoring unit 6c, a handle drive unit 6d, an authentication unit 6e, a state holding unit 6f, and a latch locking/unlocking control unit 6g. The transmission/reception unit 6b communicates with a portable key 16 held by the user to acquire an authentication ID output from the portable key 16, and authentication unit 6e determines whether or not the acquired authentication ID can be authenticated.

The state holding unit 6f holds a locked/unlocked state of a locking unit 3b of the door latch device 3 and a state whether the operation handle 1 is in the accommodated position or the use position, and the switch monitoring unit 6c monitors an output of the first and second switches 5 and 4 of the handle device (H), and transmits the output to the control unit 6a when detecting that any one of the switches is operated by the user.

When an operation on the first switch 5 or the second switch 4 is detected by the switch monitoring unit 6c, the control unit 6a confirms the state holding unit 6f, performs control based on the state held by the state holding unit 6f, sets a locking or unlocking drive signal to the latch locking/unlocking control unit 6g when the locking unit 3b of the door latch device 3 is operated, and sets a drive signal toward the use position or the accommodated position to the handle drive unit 6d so as to drive the motor 2 to rotate in either a forward or a reverse direction until an output from the use position detection sensor 7a or the accommodated position detection sensor 7b when the operation handle 1 is operated.

Figure 6:
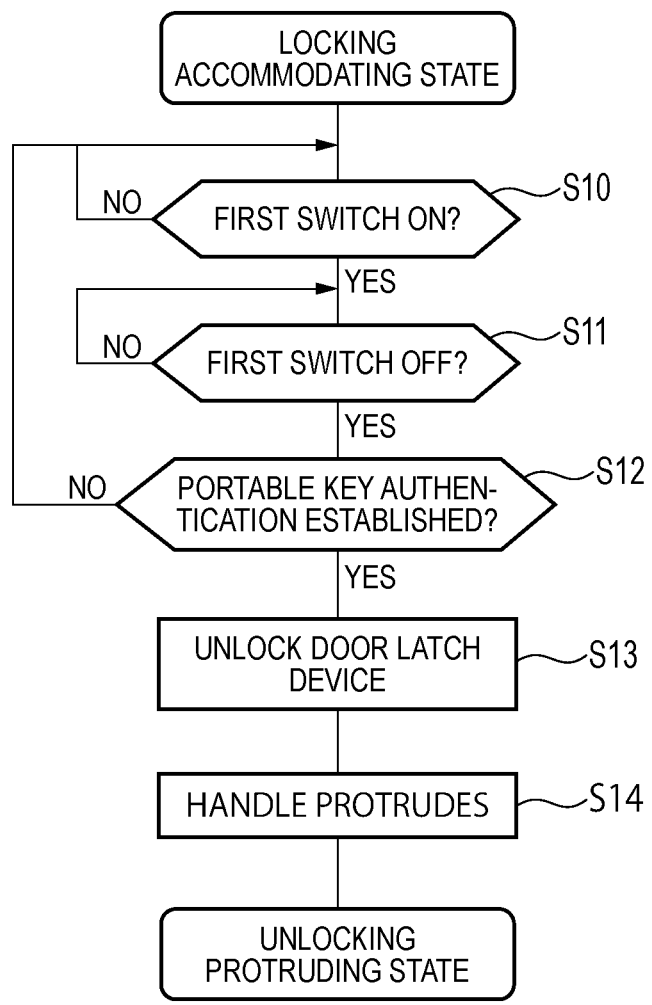
FIG. 6 is a flowchart showing an operation in a locking accommodating state.

FIG. 6 shows a control flow in the control unit 6a in the locking accommodating state. When the door latch device 3 is in the locked state and the operation handle 1 is in the accommodated position, the control starts upon detection of an operation on the first switch 5, and when the operation on the first switch 5 is detected (step S10), in order to unify all the operations such that the operations are started upon completion of the operation on the switch, the first switch 5 is confirmed to be "OFF" (step S11).

When the completion of the operation on the first switch 5 is confirmed, the authentication unit 6e communicates with the portable key 16 of the user to determine whether the authentication ID output from the portable key 16 can be authenticated, and if the authentication is established (step S12), the authentication unit 6e causes the door latch device 3 to transmit to the unlocked state (step S13), causes the operation handle 1 to protrude to the use position (step S14), and ends the control. If the authentication is not established in step S12, the process returns to the initial state and waits for an operation on the first switch 5.

Figure 7:
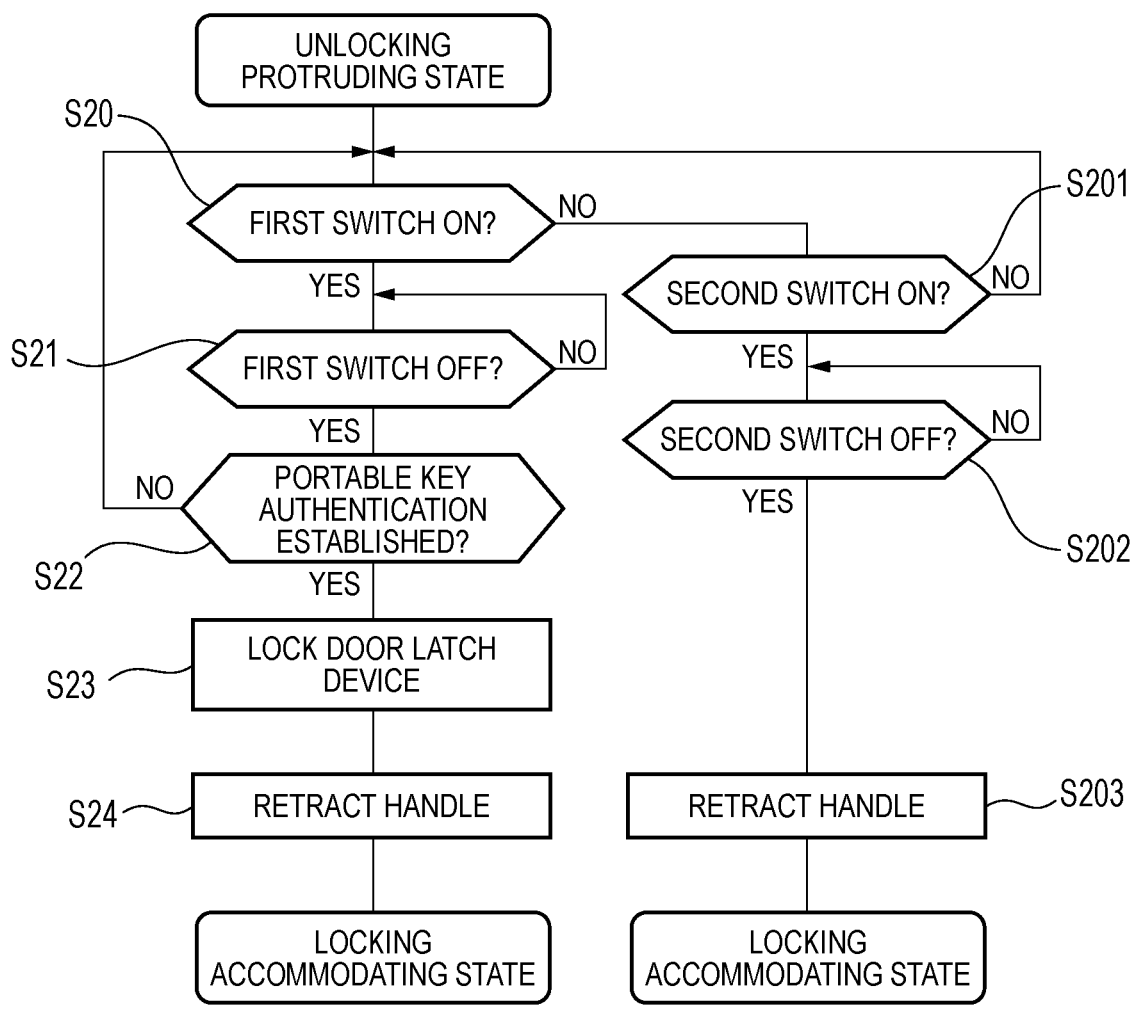
FIG. 7 is a flowchart showing an operation in an unlocking protruding state.

FIG. 7 shows a control flow in the unlocking protruding state. When the door latch device 3 is in the unlocked state and the operation handle 1 is in the use position, the control starts upon detection of an operation on the first switch 5 or the second switch, and when the operation on the first switch 5 is detected (step S20), the control waits until the first switch 5 becomes "OFF" and then authenticates the portable key 16 (steps S21, S22).

When the authentication is established in this step, the door latch device 3 transmits to the locked state (step S23), the operation handle 1 moves to the accommodated position, and the control is ended (step S24).

When the operation on the second switch is detected (step S201), the control wait for the second switch to become "OFF" and then moves the operation handle 1 to the accommodated position (step S201), and the control is ended (steps S202, S203).

Figure 8:
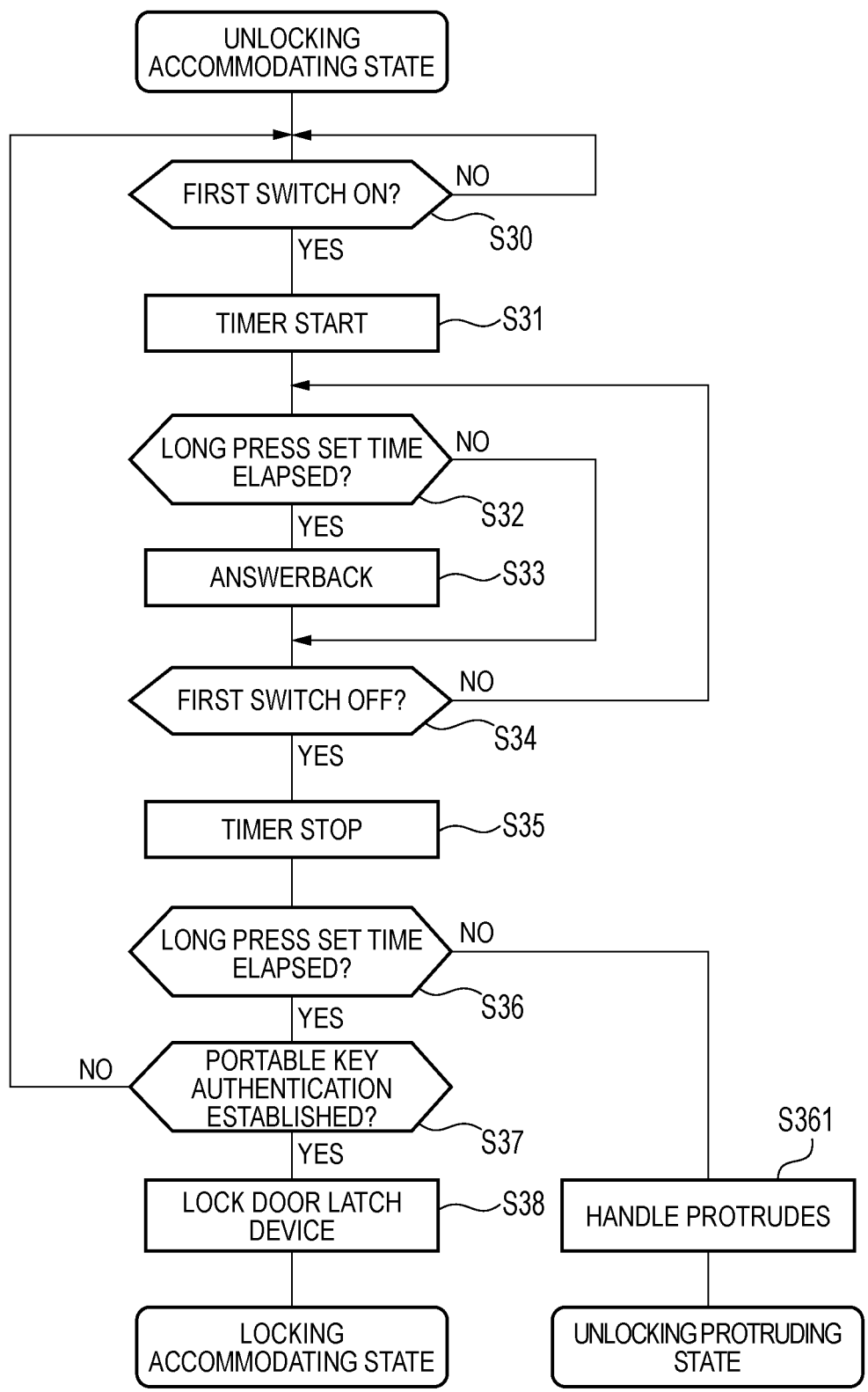
FIG. 8 is a flowchart showing an operation in an unlocking accommodating state.

FIG. 8 shows a control flow in the unlocking accommodating state. When the door latch device 3 is in the unlocked state and the operation handle 1 is in the accommodated position, the control starts upon detection of an operation on the first switch 5, and when the operation on the first switch 5 is detected (step S30), in order to determine whether the operation to the first switch 5 is a normal operation or a long press operation, clocking by a timer for determination is started (step S31).

The determination is performed upon the completion of the operation to the first switch 5, that is, the time until the first switch 5 becomes "OFF", and when the operation times elapses a long press set time (step S32), after an appropriate answerback operation such as lighting of an LED, buzzer sounding, or the like is executed (step S33), the control confirms transition to "OFF" of the first switch 5 (step S34).

When the completion of the operation on the first switch 5 is confirmed, the timer is stopped (step S35), and then, if the operation is long press, that is, if the time from the start of the operation to the completion of the operation on the first switch 5 exceeds the long press set time (step S36), the authentication operation to the portable key 16 is performed. When the authentication is established in this step (step S37), the door latch device 3 transits to the locked state and the control is ended (step S38).

On the other hand, when the long press set time is not exceeded in step S36, the operation is regarded as a normal operation, the operation handle 1 protrudes to the use position, and the control is ended (step S361).

In an aspect (1), an outside handle device for vehicle includes an operation handle 1 configured to serve as a handhold at a time of a door opening operation, and an electric actuator 2 configured to drive the operation handle 1 between an accommodated position and a use position. The outside handle device for vehicle is configured to allow a locking accommodating operation having a locking operation of a door latch device 3 fixed to a door and a non-locking accommodating operation not having a locking operation when the operation handle 1 is moved to the accommodated position.

According to the aspect (1), the outside handle device for vehicle includes the operation handle 1 that can move between the accommodated position and the use position, and the electric actuator 2 for driving the operation handle 1, and can unlatch the door latch device 3 fixed to the door to open the door by operating the operation handle 1 in the use position, which is set to a position optimal for serving as a handhold upon the door opening operation.

According to the aspect (1), when the operation handle 1 is moved from the use position to the accommodated position, the locking accommodating operation having locking of the door latch device 3 and the non-locking accommodating operation not having locking of the door latch device 3 can be selected.

A state where the operation handle 1 which can move between the accommodated position and the use position is in the use position may remind of an unlocked state of the door latch device 3, which is undesirable for crime prevention, and thus it is desirable to retract the operation handle 1 in the accommodated position in a case where the operation handle 1 is not used.

On the other hand, in a case where movement to the accommodated position necessarily involves transition to the locked state, for example, an authentication operation is required for another door opening operation, which deteriorates the usability.

According to the aspect (1), the non-locking accommodating operation can be selected so as to control the operation handle 1 to transit to the accommodated position without performing locking/unlocking operation, so that the usability can be improved.

Regarding the non-locking accommodating operation and the locking accommodating operation, for example, it is possible to select the non-locking accommodating operation by manually moving the operation handle 1 to the accommodated position, and to select the locking accommodating operation by operating an accommodating operation switch or the like set on the operation handle 1 or the like, whereas by performing both of the locking accommodating operation and the non-locking accommodating operation with the electric actuator 2, the operability can be improved.

According to the aspect (2), the operation handle 1 may include two types of accommodation instructing units configured to instruct the electric actuator 2 to drive to the accommodated position. One of the two types of accommodation instructing units may be a non-locking accommodation instructing unit 4 configured to instruct the non-locking accommodating operation, and the other of the two types of accommodation instructing units may be a locking accommodation instructing unit 5 configured to instruct the locking accommodating operation.

According the aspect (2), the locking accommodation instructing unit 5 and the non-locking accommodation instructing unit 4 may be formed as the same operation unit, and may be configured such that, for example, a single operation such as a single tap or a pressing operation that is shorter than a predetermined time is regarded as the locking accommodating operation, and a double tap, a long pressing or the like is regarded as the locking accommodating operation, whereas by arranging the non-locking accommodation instructing unit 4 at the position that is exposed to the outside only when the operation handle 1 is at the use position, the usability is improved.

The driving of the electric actuator 2 can be started immediately upon the operation on the non-locking accommodation instructing unit 4, whereas by driving the electric actuator 2 at a timing at which a push or tap operation is performed and a finger leaves the non-locking accommodation instructing unit 4, it is possible to prevent the operation handle 1 from moving to the accommodated position in a state where the finger is on the non-locking accommodation instructing unit 4, thereby reliably preventing the finger from being nipped.

According to the aspect (3), a vehicle door operating device includes an operation handle 1 configured to be driven between an accommodated position and a use position by the electric actuator 2, an outside handle device (H) configured to perform a locking accommodating and a non-locking accommodating when the operation handle is moved to the accommodated position, a door latch device 3 fixed to a door, and a control device 6 configured to control driving of an electric actuator 2 of the outside handle device (H) and locking/unlocking of the door latch device 3. The control device 5 may control the door latch device 3 to transit to a locked state only when the operation handle 1 is locked and accommodated.

According to one or more embodiments, it is possible to allow an operation handle to transit to an accommodated position in an unlocked state, thereby improving usability.

The invention claimed is:

1. An outside handle device for a vehicle comprising:
   an operation handle configured to serve as a handhold at a time of a door opening operation, the operation handle including an instructing unit; and
   an electric actuator configured to drive the operation handle between an accommodated position and a use position by an instruction from the instructing unit, wherein
   the outside handle device for the vehicle is configured to selectively allow a locking accommodating operation including a locking operation of a door latch device fixed to a door and the operation handle being moved to the accommodated position, and a non-locking accommodating operation not including a locking operation and including the operation handle being moved to the accommodated position, in response to the instruction from the instructing unit;
   when the operation handle is in the accommodated position and the door latch device is in an unlocked state, the outside handle device is configured to selectively perform the locking operation of the door latch device or drive the operation handle to the use position depending on an elapsed time of an operation of the instructing unit.

2. The outside handle device for a vehicle according to claim 1,
   wherein the instructing unit includes two types of accommodation instructing units configured to instruct the electric actuator to drive the operation handle to the accommodated position, and
   wherein one of the two types of accommodation instructing units is a non-locking accommodation instructing unit configured to instruct the non-locking accommodating operation, and the other of the two types of accommodation instructing units is a locking accommodation instructing unit configured to instruct the locking accommodating operation.

3. The outside handle device for a vehicle according to claim 2,
   wherein the non-locking accommodation instructing unit is arranged at a position exposed to an outside only when the operation handle is at the use position.

4. The outside handle device for a vehicle according to claim 3,
   wherein the electric actuator is driven after an operation of the non-locking accommodation instructing unit is finished.

5. The outside handle device for a vehicle according to claim 1,
   wherein the electric actuator is configured to start driving the operation handle at the time of an operation to the instructing unit being performed or at the time of a finger of a user leaving the instructing unit.

6. A vehicle door operating device comprising:
   an outside handle device;
   a door latch device fixed to a door; and
   a control device configured to control driving of an electric actuator of the outside handle device and locking/unlocking of the door latch device,
   wherein the outside handle device includes an operation handle configured to be driven between an accommodated position and a use position by the electric actuator, and the control device is configured to selectively perform a locking accommodating operation and a non-locking accommodating operation when the operation handle is moved to the accommodated position in response to an instruction from an instructing unit included in the operation handle,
   wherein the control device is configured to control the door latch device to transit to a locked state only when the operation handle is in the accommodated position;
   when the operation handle is in the accommodated position and the door latch device is in an unlocked state, the control device is configured to selectively control the door latch device to transit to the locked state or control the electric actuator to drive the operation handle to the use position depending on an elapsed time of an operation of the instructing unit.

7. The vehicle door operating device according to claim 6,
   wherein the electric actuator is configured to start driving the operation handle at the time of an operation to the instructing unit being performed or at the time of a finger of a user leaving the instructing unit.

* * * * *